United States Patent [19]
Hamaguchi et al.

[11] Patent Number: 6,021,472
[45] Date of Patent: Feb. 1, 2000

[54] INFORMATION PROCESSING DEVICE AND CONTROL METHOD THEREOF

[75] Inventors: Kazumasa Hamaguchi, Yokohama; Toshiyuki Fukui, Kawasaki; Shuichi Nakamura, Yokohama, all of Japan

[73] Assignee: Canon Kabushiki Kaisha, Tokyo, Japan

[21] Appl. No.: 08/699,943

[22] Filed: Aug. 20, 1996

[30] Foreign Application Priority Data

Aug. 21, 1995 [JP] Japan .................................... 7-211796
Aug. 21, 1995 [JP] Japan .................................... 7-211797

[51] Int. Cl.$^7$ .................................................. G06F 12/08
[52] U.S. Cl. ........................................................ 711/141
[58] Field of Search .................................. 395/500, 440, 395/441, 445–473

[56] References Cited

U.S. PATENT DOCUMENTS

| | | | |
|---|---|---|---|
| 5,222,224 | 6/1993 | Flynn et al. | 395/425 |
| 5,265,235 | 11/1993 | Sindhu et al. | 395/425 |
| 5,313,609 | 5/1994 | Baylor et al. | 395/425 |
| 5,386,546 | 1/1995 | Hamaguchi | 395/425 |
| 5,434,993 | 7/1995 | Liencres et al. | 395/425 |
| 5,577,218 | 11/1996 | Hamaguchi | 395/405 |

*Primary Examiner*—Kevin J. Teska
*Assistant Examiner*—Ayni Mohamed
*Attorney, Agent, or Firm*—Fitzpatrick, Cella, Harper & Scinto

[57] ABSTRACT

An operation for achieving consistency among copies existing in a plurality of cache memories in a parallel computer system was performed per transaction. If an access issued from a processor to a cache memory is a synchronous access, seeking of a DIRTY block in the cache memory is started. The cache memory issues a bus transaction onto a system bus and performs write back of the DIRTY block in the cache memory relative to a main memory. The write back bus transaction issued from the cache memory in the foregoing fashion is snooped by the other cache memory. With this arrangement, an unnecessary consistency holding operation can be omitted to reduce a delay upon memory accessing in a parallel computer system employing a loose memory consistency model.

25 Claims, 12 Drawing Sheets

V : VALID FLAG
D : DIRTY FLAG

V : VALID FLAG
S : SHARED FLAG
D : DIRTY FLAG
R : RELEASED FLAG

INFORMATION PROCESSING DEVICE AND CONTROL METHOD THEREOF

BACKGROUND OF THE INVENTION

1. Field of the Invention

The present invention relates to an information processing device having a plurality of processors and a plurality of cache memories, and a control method thereof.

2. Related Background Art

In a conventional parallel computer system, each of processors is in general associated with a cache memory for a high-speed response to an access demand from the processor to a main memory and for reducing traffics of a mutual coupling network. Memory access from each processor is achieved via the cache memory, and the cache memory holds copies of data blocks as being memory access objects. In the parallel computer system, it is possible to take place that copies of the same data block exist in the cache memories. For ensuring consistency among those copies, various methods have been proposed.

In the parallel computer system using what can monitor all the transaction, such as buses, in the coupling network mutually connecting between the processors and between the processors and the main memory, the snoop method has been used in general. In the snoop method, each cache memory monitors all the transaction sent on the coupling network and, when a copy of a data block as an object of the transaction exists in the own cache memory, it performs a given necessary consistency holding operation.

On the other hand, in the parallel computer system using what can not monitor all the transaction, in the coupling network mutually connecting between the processors and between the processors and the main memory, the directory method has been used. In the directory method, caching data about which of cache memories includes a copy of data is stored and managed in a storage device, called a directory, per data block unit or per unit similar to that and, upon issuance of a transaction from the processor, an occurrence of the transaction is notified to the cache memory having a copy of transaction object data block based on the caching data obtained from the directory, so as to hold consistency among the copies.

As described above, the operation for achieving the consistency among the copies existing in a plurality of the cache memories in the conventional parallel computer system has been performed per transaction.

However, this is not suitable for loose memory consistency models which have been proposed for suppressing a latency of access to the memory. In general, in the loose memory consistency model, a synchronous point is predetermined in the course of process and, when the process reaches the synchronous point, it is obligated that the memory transactions issued up to then are reflected on the system. This means that it is not necessary to reflect memory transaction results prior to the synchronous point. Specifically, when using the conventional cache consistency holding technique in the parallel computer system employing the loose memory consistency model, a consistency holding operation occurs, per transaction, which is not necessary at that time point so that its overhead is against the object of the loose memory consistency model and inadvertently increases the memory access latency.

SUMMARY OF THE INVENTION

A preferred embodiment of the present invention provides an information processing device comprising a plurality of processors, a plurality of cache memories associated with the processors, respectively, a storage device, and a coupling network mutually connecting between the cache memories and the storage device, wherein consistency holding of data blocks existing in the cache memories is performed only at a time point where a process of the processor reaches a predetermined stage.

DESCRIPTION OF THE PREFERRED EMBODIMENTS

Hereinbelow, preferred embodiments of the present invention will be described with reference to the accompanying drawings.

First Embodiment

<Structure of Multiprocessor System>

Figure 1:
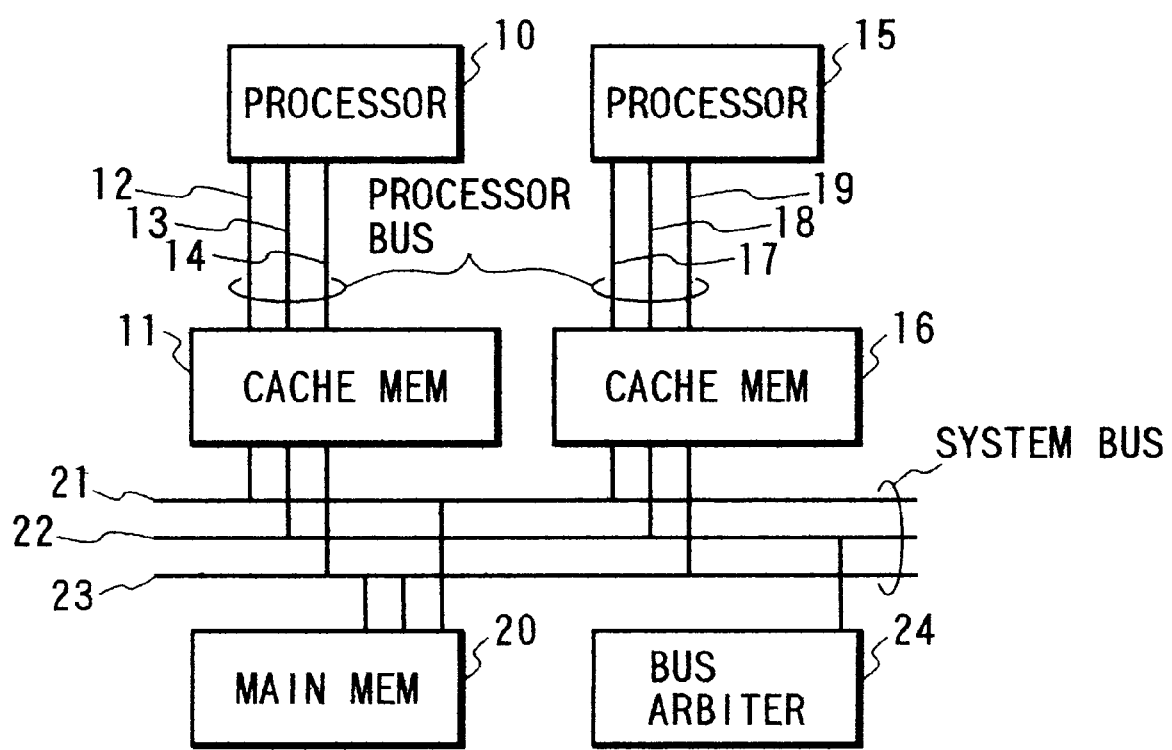
FIG. 1 is a diagram showing a structure of a multiprocessor system according to a first preferred embodiment of the present invention.

FIG. 1 is a diagram showing a structure of a multiprocessor system according to a first preferred embodiment of the present invention.

Numerals 10 and 15 denote processors which are connected to cache memories 11 and 16 via processor buses (12–14, 17–19), respectively. The processor buses include control signal lines 12 and 17, address signal lines 13 and 18 and data signal lines 14 and 19. The cache memories 11 and 16 are connected therebetween and to a main memory 20 via system buses (21, 22, 23) for reflecting upon the main memory 20 and for snooping address data or the like on the buses so as to perform the maintenance of the caches. The system buses include a control signal line 21, an address signal line 22 and a data signal line 23. A bus arbiter 24 is for mediating using rights of the system buses (21, 22, 23).

Figure 2:
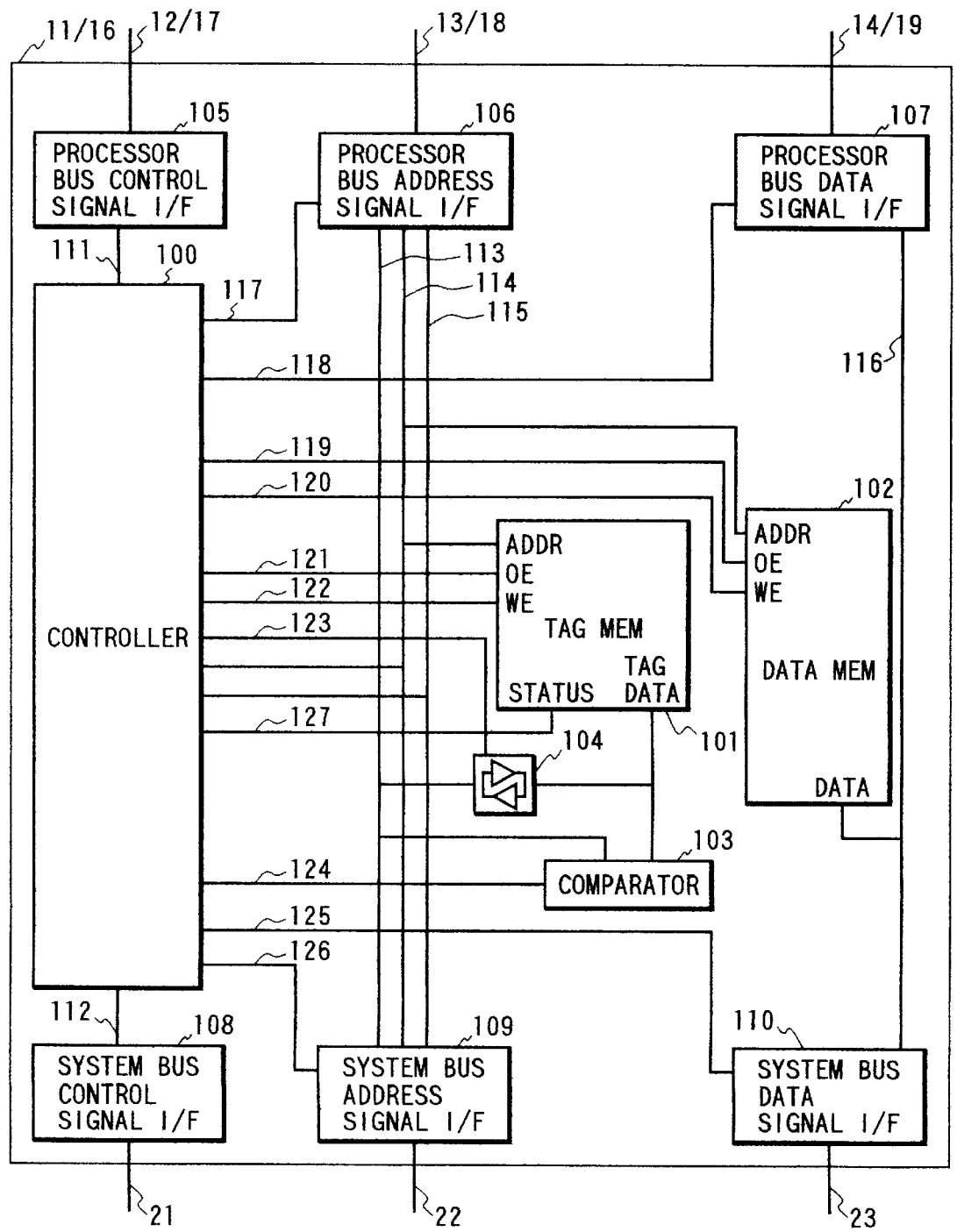
FIG. 2 is a diagram showing a structure of a cache memory used in the multiprocessor system shown in FIG. 1.

FIG. 2 is a structural diagram of the cache memory 11, 16 shown in FIG. 1.

A body of the cache includes a controller 100 for controlling the whole cache, a tag memory 101, a data memory 102, a comparator 103, a buffer 104, a control signal interface 105 relative to the processor bus, an address signal interface 106 relative to the processor bus, a data signal interface 107 relative to the processor bus, a control signal interface 108 relative to the system bus, an address signal interface 109 relative to the system bus and a data signal interface 110 relative to the system bus.

Figure 3:
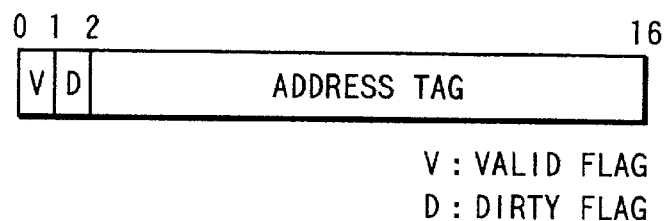
FIG. 3 is a diagram showing a field structure of tag memory entry.

As shown in FIG. 3, the tag memory 101 is a memory for storing an address as being a tag of a data block in the cache memory 11, 16 and a flag indicative of a status thereof. The data memory 102 is a memory for storing data itself of the data block. The comparator 103 checks hit or miss. The buffer 104 is used upon reading from or writing on the tag memory.

Figure 4:
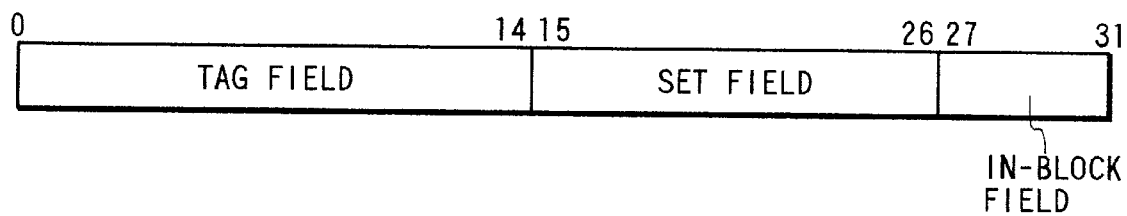
FIG. 4 is a diagram showing a field structure of address in the multiprocessor system shown in FIG. 1.

Numeral 111 denotes a signal line between the processor bus control signal interface 105 and the controller 100. Numeral 112 denotes a signal line between the system bus control signal interface 108 and the controller 100. Numerals 113, 114 and 115 denote address signal lines for outputting a tag field (15 bits from bit 0 to bit 14), a set field (12 bits from bit 15 to bit 26) and an in-block field (5 bits from bit 27 to bit 31) as shown in FIG. 4, respectively. Numeral 116 denotes a data signal line. Numeral 117 denotes a control signal line between the controller 100 and the processor bus address signal interface 106, and numeral 118 denotes a control signal line between the controller 100 and the processor bus data signal interface 107. Numeral 119 denotes an OE (output enable) signal of the data memory 102 issued by the controller 100, and numeral 120 denotes a WE (write enable) signal of the data memory 102 issued by the controller 100. Numeral 121 denotes an OE signal of the tag memory 101 issued by the controller 100, and numeral 122 denotes a WE signal of the tag memory 101 issued by the controller 100. Numeral 123 denotes a direction control signal of the buffer 104 issued by the controller 100. Numeral 124 denotes a signal line for sending a result of the comparison by the comparator 103 to the controller 100. Numeral 125 denotes a control signal line between the controller 100 and the system bus data signal interface 110, and numeral 126 denotes a control signal line between the controller 100 and the system bus address signal interface 109. Numeral 127 denotes a signal line for sending a status of entry stored in the tag memory 101.

In this preferred embodiment, the structure of the cache memory is of a direct map type with a 4k entry and a data block size 32B. However, the present invention is not limited thereto.

In this preferred embodiment, an example is shown, wherein the consistency of the cache memories is achieved based on a cache memory control method suitable for the loose memory consistency model, in the system having the structure shown in FIGS. 1 and 2.

Hereinbelow, an operation of the system will be described.

The following explanation relates to a case wherein access is issued from the processor 10. However, the present invention is not limited thereto. The same process can be applied to a case wherein access is issued from the processor 15.

Figure 5:
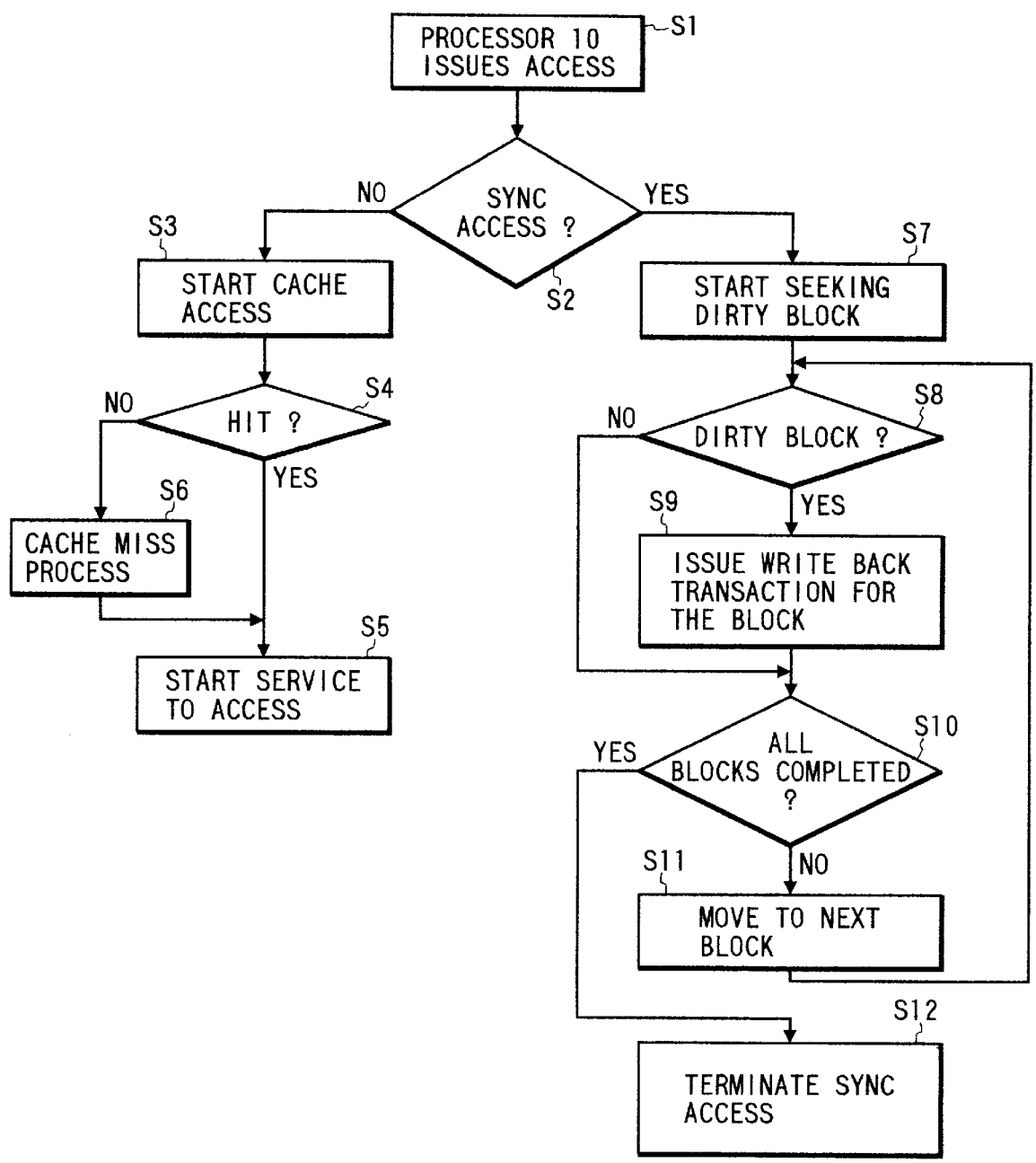
FIG. 5 is a flowchart showing an operation of the cache memory triggered by an access issuance from a processor according to the first preferred embodiment.

FIG. 5 is a flowchart of an operation triggered by an access from the processor 10.

When the processor 10 issues an access at step Si, the processor bus control signal interface 105 decodes an outputted control signal and notifies the controller 100 of an issuance of access from the processor 10. Specifically, at step S2, the processor bus control signal interface 105 determines whether it is a synchronous access or not, and notifies the controller 100 of the issuance of access from the processor and an access attribute (read/write, access size, whether synchronous access or not, and the like). In this preferred embodiment, the processor 10 can issue the access defined as a synchronous access and, by decoding the control signal indicative of an access kind, it can be determined whether the issued access is the synchronous access or not.

If the issued access is not the synchronous access, the cache memory performs its general operation as shown at steps S3 through S6.

At step S3, the cache access is started by the process described hereinbelow.

Using the control signal line 117, the controller 100 instructs the processor bus address signal interface 106 to output an address into the cache memory 11. In response to this, the processor bus address signal interface 106 outputs the address, that is, the tag field onto the address signal line 113, the set field onto the address line 114 and the in-block field onto the address line 115. The controller 100 asserts the OE signal 122 of the tag memory 101. If the access issued by the processor 10 is a read access, the controller 100 also asserts the OE signal 119 of the data memory 102 simultaneously. The tag memory 101 outputs contents of an entry designated by the set field.

Then, step S4 determines whether a cache hit is achieved, based on the following process.

The outputted data is compared with the tag field at the comparator 103, and a result of the comparison (agreement/disagreement) is notified to the controller 100 via the signal line 124. If the notified comparison result is agreement, it means the cache hit so that the service to the access is started at step S5. On the other hand, in case of disagreement, it means the cache miss so that a cache miss process is performed at step S6.

Now, the service to the access at step S5 will be explained.

LOAD Instruction

The following represents a control procedure by the cache 11 upon execution of a LOAD instruction.
(a) Using the control signal line 118, the controller 100 instructs the processor bus data signal interface 107 to output data designated by the in-block field of the address onto the data signal line 14 of the processor bus.
(b) Using the control signal line 111, the controller 100 instructs the processor bus control signal interface 105 to terminate the access.
(c) The processor bus data signal interface 107 outputs the data onto the data signal line 14, and the processor bus control signal interface 105 terminates the access.
(d) The processor 10 receives the data.

STORE Instruction

The following represents a control procedure by the cache 11 upon execution of a STORE instruction.

(a) Using the control signal line 118, the controller 100 instructs the processor bus data signal interface 107 to output data outputted on the data signal line 14 into the cache memory 11, and the data is outputted on the data signal line 116 of the cache memory 11, 16.
(b) The controller 100 asserts the WE signal 120 of the data memory 102 corresponding to designation by the in-block field of the address so as to write the data in the data memory 102. Further, the controller 100 outputs 0b11 (V flag=1, D flag=1) onto the signal line 127 and asserts the WE signal 122 of the tag memory 101 so as to update a status of the entry concerned.
(c) Using the control signal line 111, the controller 100 instructs the processor bus control signal interface 105 to terminate the access, and the processor bus control signal interface 105 terminates the access.

Now, an operation will be explained when the issued access is the synchronous access at step S2.

At step S7, seeking of a DIRTY block (a data block rewritten by a write access from the processor) is started.
(1) The controller 100 outputs 0x000 onto the address line 114 corresponding to the set field and asserts the OE signal 121 of the tag memory 101. Simultaneously, the controller 100 asserts the OE signal 119 of the data memory 102 and performs a direction control of the buffer 104 using the control signal 123 such that the tag data outputted from the tag memory 101 is outputted onto the address line 113 corresponding to the tag field.

If, at step S8, a status value (V flag and D flag) of the block outputted from the tag memory 101 is 0b11, that is, it is determined that the concerned entry is in a DIRTY status, the controller 100 performs a write back process at step S9 in the following manner.
(2-a) Using the control signal line 112, the controller 100 instructs the system bus control signal interface 108 to obtain the system bus. In response to this, the system bus control signal interface 108, using the control signal line 21, demands use of the system bus to the bus arbiter 24. After mediation, the bus arbiter 24, using the control signal line 21, notifies permission of use of the system bus. In response to this, the system bus control signal interface 108, using the control signal line 112, notifies the controller 100 of acquirement of the system bus.
(2-b) Using the control signal line 126, the controller 100 instructs the system bus address signal interface 109 to output the address onto the address signal line 22 of the system bus and, using the control signal line 125, the controller 100 instructs the system bus data signal interface 110 to output the data onto the data signal line 23 of the system bus. Further, using the control signal line 112, the controller 100 instructs the system bus control signal interface 108 to start a bus transaction.
(2-c) The bus transaction is issued onto the system bus, and the write back of the concerned data block is performed relative to the main memory 20.

The controller 100 outputs 0b10 (V flag=1, D flag=0) onto the signal line 127 and asserts the WE signal 122 of the tag memory 101 so as to update the concerned entry.

The set field is incremented by a unit of 0x001, and the seeking operation is repeated until it reaches 0xfff. When it is determined at step S10 that the seeking operation is completed for all the blocks, the controller 100, using the control signal line 111, instructs the processor bus control signal interface 105 to terminate the access, and the processor bus control signal interface 105 terminates the access (step S12).

On the other hand, if step S10 determines that the seeking operation is not completed for all the blocks, the routine returns to the process of step S8.

The write back bus transaction issued from the cache memory 11 in the foregoing fashion is snooped by the other cache memory 16.

Figure 6:
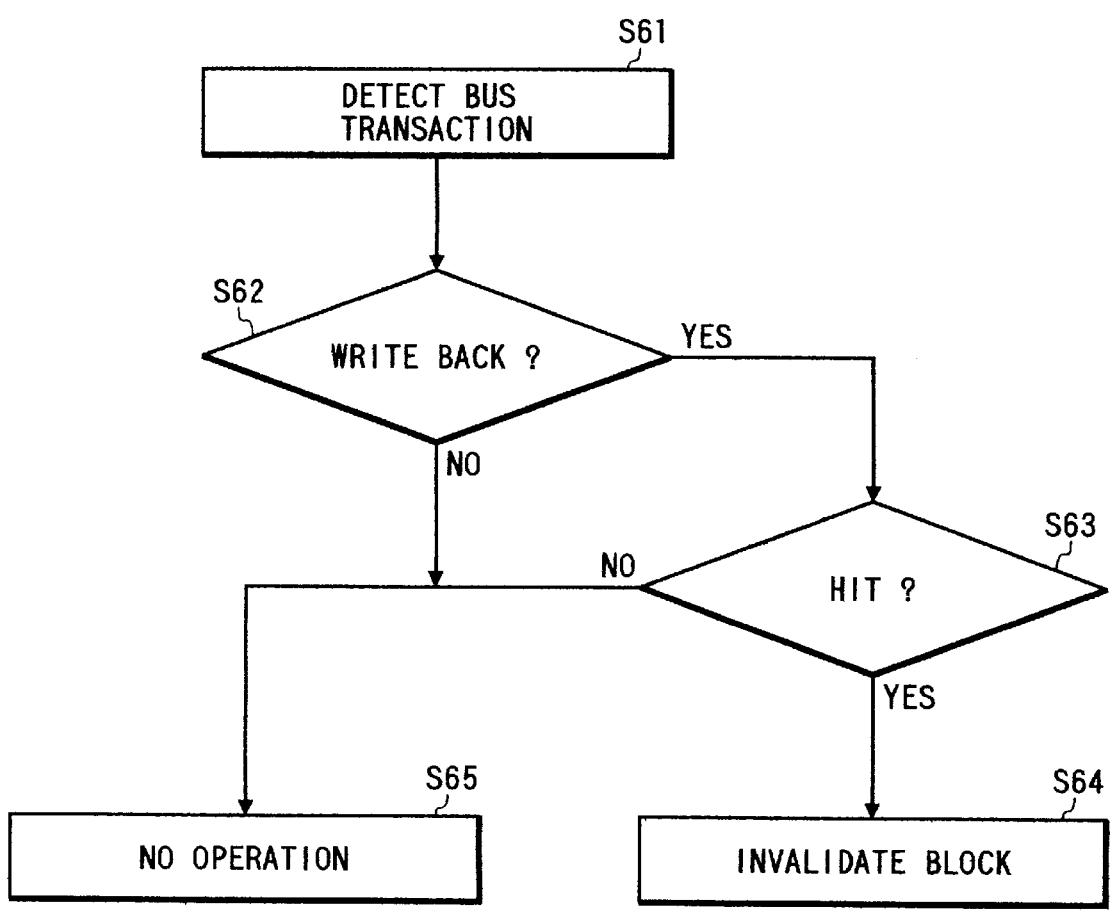
FIG. 6 is a flowchart of an operation of the cache memory triggered by a bus transaction.

FIG. 6 is a flowchart of an operation triggered by the write back bus transaction.

If the issuance of the bus transaction onto the system bus is detected at step S61 and the detected bus transaction is determined to be the write back at step S62, the system bus control signal interface 108, using the signal line 112, notifies the controller 100 of such an occurrence. On the other hand, if the detected bus transaction is determined not to be a write back bus transaction at step S62, no operation is performed at step S65. If the detected bus transaction is determined to be the write back at step S62 and the hit is determined at step S63, the routine proceeds to step S64 where a block invalidation process is performed.

Hereinbelow, the block invalidation process will be explained.

In response to the notification, the controller 100 performs the following operation.
(1) Using the control signal line 126, the controller 100 instructs the system bus address signal interface 109 to output the address into the cache memory 16.
(2) The system bus address signal interface 109 outputs the address, that is, the tag field onto the address signal line 113, the set field onto the address line 114 and the in-block field onto the address line 115.
(3) The controller 100 asserts the OE signal 121 of the tag memory 101.
(4) The tag memory 101 outputs contents of the entry designated by the set field. The outputted data is compared with the tag field at the comparator 103, and a result of the comparison (agreement/disagreement) is notified to the controller 100 via the signal line 124.
(5) If the notified comparison result is disagreement, the operation here is finished. In case of agreement, the controller 100 outputs 0b00 (V flag=0, D flag=0) onto the signal line 127 and asserts the WE signal 122 of the tag memory 101 so as to update a status of the entry concerned and invalidate the data block concerned.

Figure 7:
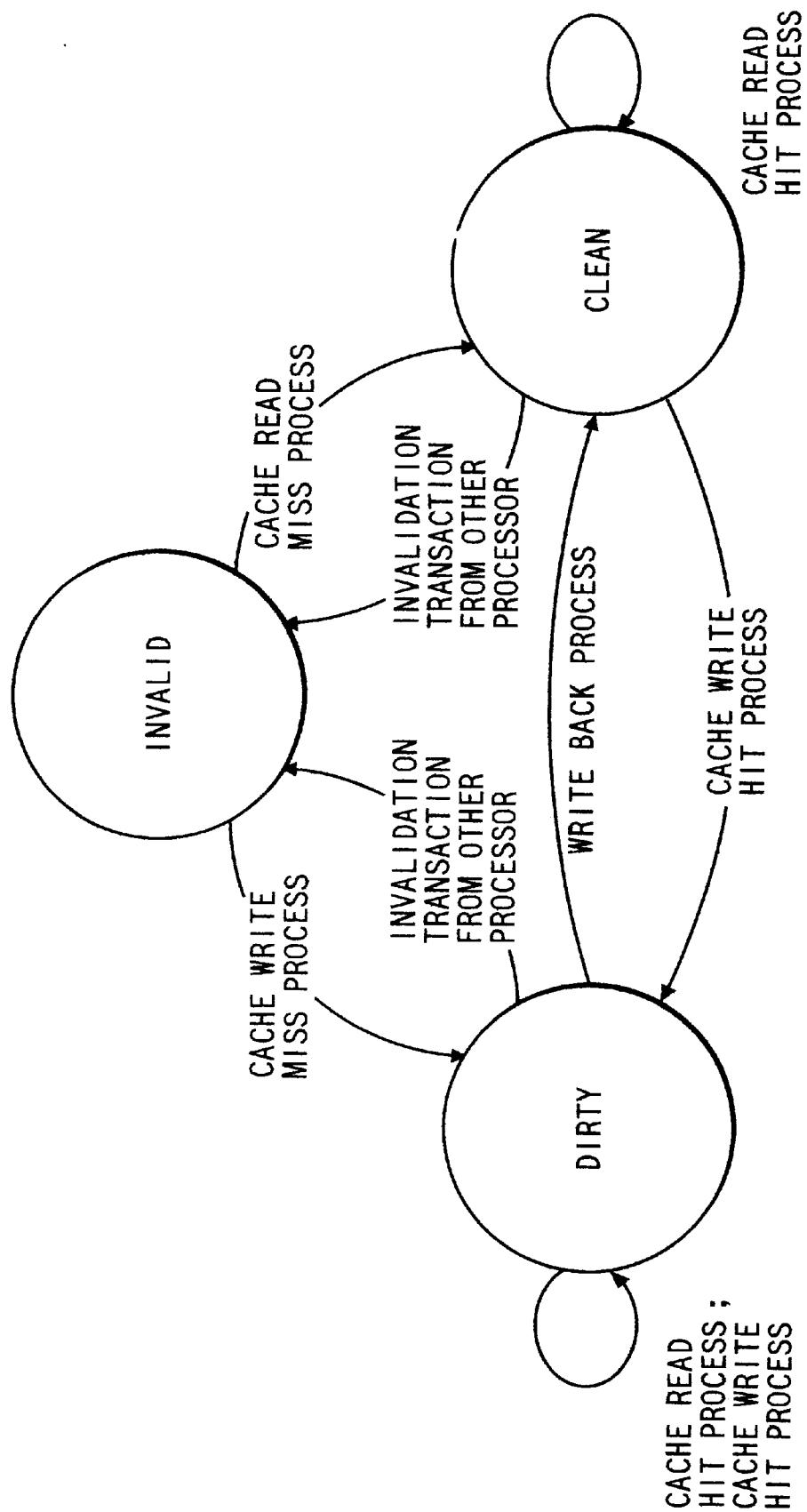
FIG. 7 is a status transition diagram of a data block in the cache memory.

The cache memories 11 and 16 of the present system operate in the foregoing fashion, and a status transition diagram becomes as shown in FIG. 7.

FIG. 7 is a status transition diagram of a status flag upon execution of the memory transactions. Hereinafter, explanation will be made assuming that the status flag is a status flag of the cache memory 11.

In FIG. 7, a status "INVALID" represents that a data entry managed by the status flag is invalid. A status "CLEAN" represents that a data entry managed by the status flag and read out from the main memory is not rewritten. The data entry stores the same value as that of the main memory, while it is possible that a data entry of the other cache stores the newest value. A status "DIRTY" represents that a data entry managed by the status flag and read out from the main memory is rewritten with the newest value once or more, and the rewritten value is not reflected upon the main memory. The data entry concerned stores the newest value.
<1> the LOAD instruction is issued from the processor 10 relative to the "INVALID" status data, a cache read miss process is performed and the status flag shifts to "CLEAN".
<2> the STORE instruction is issued from the processor 10 relative to the "INVALID" status data, the cache read miss process is once performed and the status flag shifts to "CLEAN". Thereafter, when a cache write hit process is performed, the status flag shifts to "DIRTY".
<3> the LOAD instruction is issued from the processor 10 relative to the "CLEAN" status data, the cache read hit process is performed and the status flag shifts to "CLEAN".

<4> the STORE instruction is issued from the processor 10 relative to the "CLEAN" status data, the cache write hit process is performed and the status flag shifts to "DIRTY".

<5> the snoop hit is achieved for a write back process of an external bus master relative to the "CLEAN" status data, the consistency holding operation is performed and the status flag shifts to "INVALID".

<6> the LOAD instruction is issued from the processor 10 relative to the "DIRTY" status data, the cache read hit process is performed and the status flag remains to be "DIRTY".

<7> the STORE instruction is issued from the processor 10 relative to the "DIRTY" status data, the cache write hit process is performed and the status flag remains to be "DIRTY".

<8> a write back process to the main memory is performed relative to the "DIRTY" status data, the status flag shifts to "CLEAN".

<9> the snoop hit is achieved for the write back process of the external bus master relative to the "DIRTY" status data, the consistency holding operation is performed and the status flag shifts to "INVALID".

By shifting the status as described above, the consistency between the cache blocks and the main memory shown in FIG. 1 can be ensured.

Second Embodiment

Since the structure of the system is the same as that shown in FIG. 1, explanation thereof will be omitted.

Figure 8:
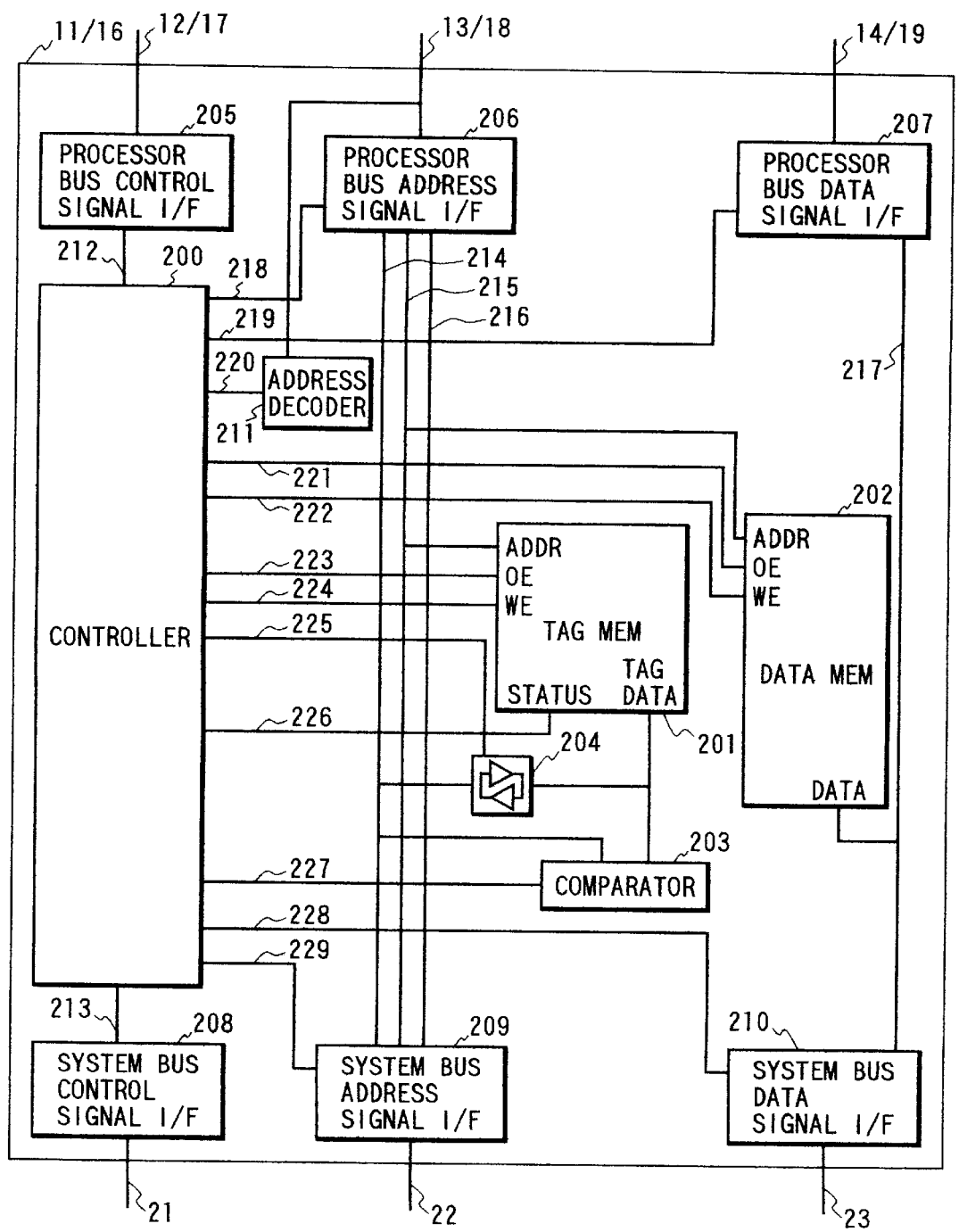
FIG. 8 is a diagram showing a structure of a cache memory according to a second preferred embodiment of the present invention.

FIG. 8 is a structural diagram of a cache memory 11, 16 according to a second preferred embodiment of the present invention.

A body of the cache includes a controller 200 for controlling the whole cache, a tag memory 201, a data memory 202, a comparator 203, a buffer 204, a control signal interface 205 relative to the processor bus, an address signal interface 206 relative to the processor bus, a data signal interface 207 relative to the processor bus, a control signal interface 208 relative to the system bus, an address signal interface 209 relative to the system bus, a data signal interface 210 relative to the system bus and an address decoder 211.

As shown in FIG. 3, the tag memory 201 is a memory for storing an address as being a tag of a data block in the cache memory 11, 16 and a flag indicative of a status thereof. The data memory 202 is a memory for storing data itself of the data block. The comparator 203 checks hit or miss.

The buffer 204 is used upon reading data from or writing data into the tag memory. The control signal interface 205 is an interface with the processor bus. The address signal interface 206 is an interface with the processor bus. The data signal interface 207 is an interface with the processor bus. The control signal interface 208 is an interface with the system bus. The address signal interface 209 is an interface with the system bus. The data signal interface 210 is an interface with the system bus.

Numeral 211 denotes an address decoder. Numeral 212 denotes a signal line between the processor bus control signal interface 205 and the controller 200. Numeral 213 denotes a signal line between the system bus control signal interface 208 and the controller 200. Numerals 214, 215 and 216 denote address signal lines for outputting a tag field, a set field and an in-block field as shown in FIG. 4, respectively. Numeral 217 denotes a data signal line. Numeral 218 denotes a control signal line between the controller 200 and the processor bus address signal interface 206, and numeral 219 denotes a control signal line between the controller 200 and the processor bus data signal interface 207. Numeral 220 denotes a signal line for notifying the controller 200 of a result of decoding at the address decoder 211. Numeral 221 denotes an OE signal of the data memory 202 issued by the controller 200, and numeral 222 denotes a WE signal of the data memory 202 issued by the controller 200. Numeral 223 denotes an OE signal of the tag memory 201 issued by the controller 200, and numeral 224 denotes a WE signal of the tag memory 201 issued by the controller 200. Numeral 225 denotes a direction control signal of the buffer 204 issued by the controller 200. Numeral 226 denotes a signal line for sending a status of entry stored in the tag memory 201. Numeral 227 denotes a signal line for sending a result of the comparison by the comparator 203 to the controller 200. Numeral 228 denotes a control signal line between the controller 200 and the system bus data signal interface 210, and numeral 229 denotes a control signal line between the controller 200 and the system bus address signal interface 209.

In this preferred embodiment, the structure of the cache memory is of a direct map type with a 4k entry and a data block size 32B. However, the present invention is not limited thereto.

In this preferred embodiment, an example is shown, wherein the consistency of the cache memories is achieved based on a cache memory control method suitable for the loose memory consistency model, in the system having the structure shown in FIGS. 1 and 8.

Hereinbelow, an operation of the system will be described.

The following explanation relates to a case wherein access is issued from the processor 10.

However, the present invention is not limited thereto. The same process can be applied to a case wherein access is issued from the processor 15.

Figure 9:
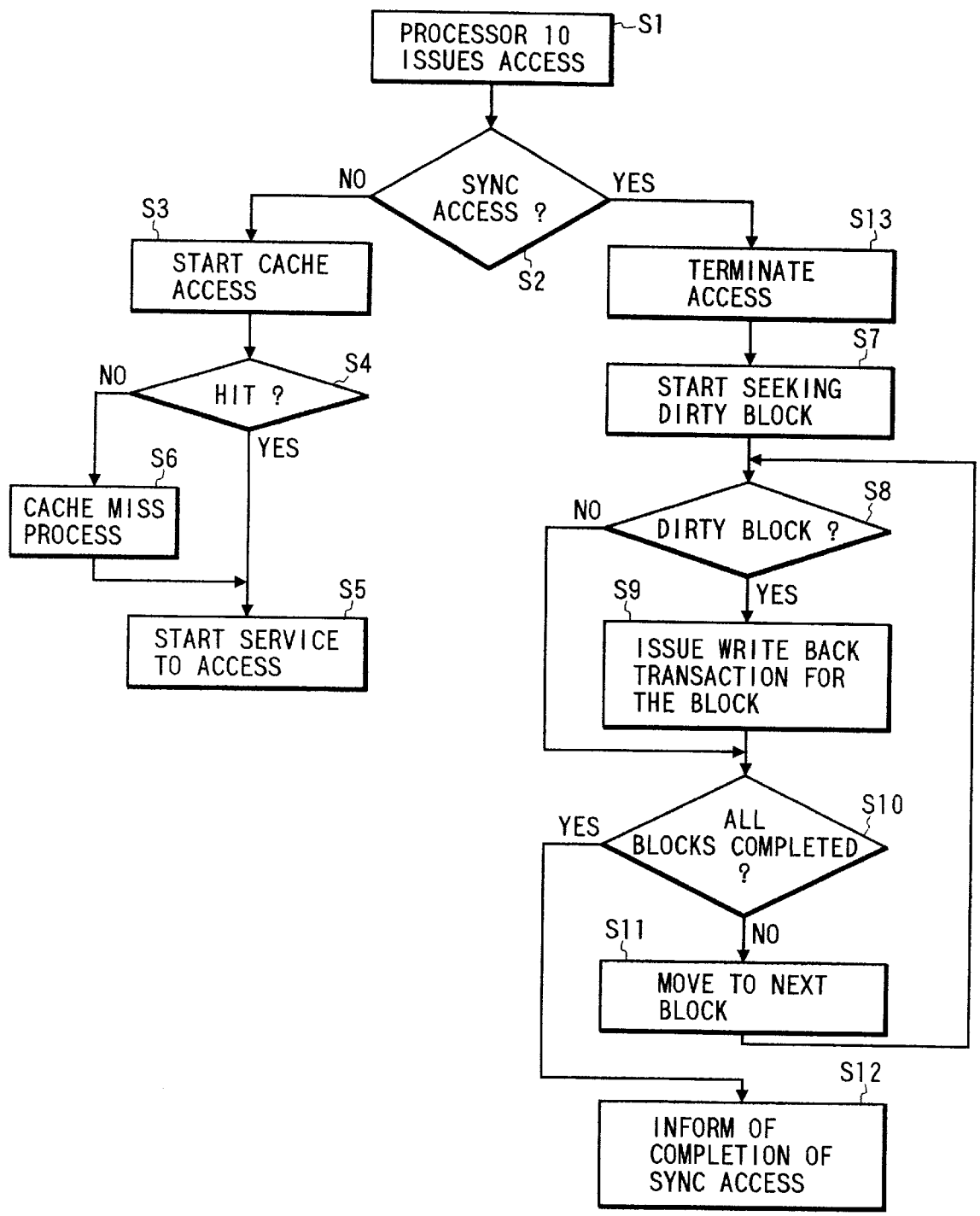
FIG. 9 is a flowchart showing an operation of the cache memory triggered by an access issuance from a processor according to the second preferred embodiment.

FIG. 9 is a flowchart of an operation triggered by an access from the processor 10.

Since steps shown in FIG. 9 perform substantially the same operations as those shown in FIG. 5 except step S13, detailed explanation along the respective steps will be omitted.

When the processor 10 issues an access at step Si, the processor bus control signal interface 205 decodes an outputted control signal and the address decoder 211 decodes an address. Using the signal line 212, the processor bus control signal interface 205 notifies the controller 200 of an issuance of access from the processor 10 and an access attribute (read/write, access size, and the like).

Using the signal line 220, the address decoder 211 notifies the controller 200 whether the address indicates a synchronous point operation instructing address or not.

In this preferred embodiment, an address for the processor 10 to notify the cache memory 11 that the process reaches the synchronous point, is defined and, by decoding the address, it can be determined whether the access is for that instruction or not.

If the access address does not indicate the synchronous point operation instructing address, the cache memory performs its general operation similar to that explained in the foregoing first preferred embodiment. On the other hand, if the access address indicates the synchronous point operation instructing address, the routine proceeds to step S13 where the controller 200, using the control signal line 212, instructs the processor bus control signal interface 205 to terminate the access, and the processor bus control signal interface 205 terminates the access. After performing the synchronous point operation instruction, the processor 10 is set into a wait state.

Subsequently, the following operation will be performed.
(1) The controller 200 outputs 0x000 onto the address line 215 corresponding to the set field and asserts the OE signal 223 of the tag memory 201. Simultaneously, the controller 200 asserts the OE signal 221 of the data memory 202 and performs a direction control of the buffer 204 using the control signal 225 such that the tag data outputted from the tag memory 201 is outputted onto the address line 214 corresponding to the tag field.
(2) If a status value (V flag and D flag) of the block outputted from the tag memory 201 is 0b11, that is, the concerned entry is in a DIRTY status, the controller 200 performs a write back process in the following manner.
(2-a) Using the control signal line 213, the controller 200 instructs the system bus control signal interface 208 to obtain the system bus. In response to this, the system bus control signal interface 208, using the control signal line 21, demands use of the system bus to the bus arbiter 24. After mediation, the bus arbiter 24, using the control signal line 21, notifies permission of use of the system bus. In response to this, the system bus control signal interface 208, using the control signal line 213, notifies the controller 200 of acquirement of the system bus.
(2-b) Using the control signal line 229, the controller 200 instructs the system bus address signal interface 209 to output the address onto the address signal line 22 of the system bus and, using the control signal line 228, the controller 200 instructs the system bus data signal interface 210 to output the data onto the data signal line 23 of the system bus. Further, using the control signal line 213, the controller 200 instructs the system bus control signal interface 208 to start a bus transaction.
(2-c) The bus transaction is issued onto the system bus, and the write back of the concerned data block is performed relative to the main memory 20.
(3) The controller 200 outputs 0b10 (V flag=1, D flag=0) onto the signal line 226 and asserts the WE signal 224 of the tag memory 201 so as to update the concerned entry.

The set field is incremented by a unit of 0x001, and the seeking operation is repeated until it reaches 0xfff. When the seeking operation is completed for all the blocks, the controller 200, using the control signal line 212, instructs the processor bus control signal interface 205 to notify the processor 10 of completion of the synchronous point operation by an interrupt or the like. In response to this, the processor bus control signal interface 205 notifies the processor 10 of the completion of the synchronous point operation, and the processor 10 is released from the wait state.

The write back bus transaction issued from the cache memory 11 in the foregoing fashion is snooped by the other cache memory 16 and, when a data block of the same address is cached, the invalidation of that data block is performed like in the foregoing first preferred embodiment. Further, a status transition diagram of the cache memory in the system of this preferred embodiment also becomes as shown in FIG. 7 like in the first preferred embodiment.

As described above, all the DIRTY data blocks existing in the cache memory at the time point where the process of the processor reaches the synchronous point are subjected to the write back, and the consistency holding operation is only performed relative to the write back transactions. Thus, in the parallel computer system which performs the operation based on the loose memory consistency model, the unnecessary consistency holding operation can be omitted to reduce a delay upon reading so as to improve the system performance.

Third Embodiment

Since the structure of the system is the same as those shown in FIGS. 1 and 2, explanation thereof will be omitted.

Figure 10:
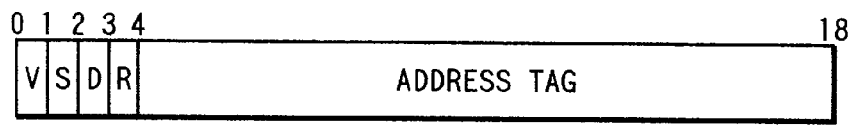
FIG. 10 is a diagram showing a field structure of tag memory entry.

FIG. 10 is a diagram showing a field structure of tag memory entry.

In this preferred embodiment, the structure of the cache memory is of a direct map type with a 4k entry and a data block size 32B. However, the present invention is not limited thereto.

In this preferred embodiment, an example is shown, wherein the consistency of the cache memories is achieved based on a cache memory control method suitable for the loose memory consistency model, in the system having the structure shown in FIGS. 1 and 2.

Hereinbelow, an operation of the system will be described.

Figure 11:
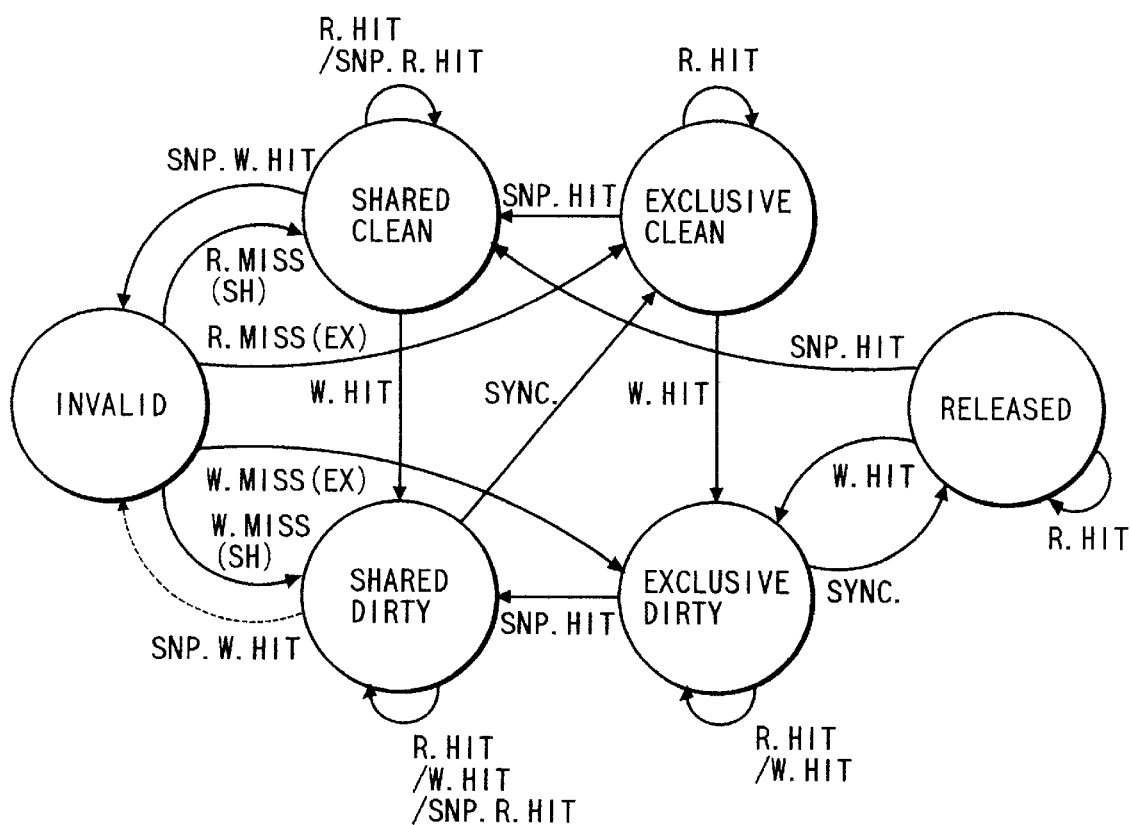
FIG. 11 is a status transition diagram of a data block in a cache memory according to a third preferred embodiment of the present invention.

As shown in FIG. 11, a cache memory 11, 16 in the system of this preferred embodiment manages the stored data blocks in the following six states and performs an operation depending on corresponding one of the states relative to an access from the processor or a transaction issued onto the system bus.

<1> INVALID

This is an invalid state or status. Specifically, no valid data block is stored in that entry.

<2> EXCLUSIVE-CLEAN

This is a status wherein the data block is not stored in the other cache memory and the consistency with the main memory is achieved.

<3> SHARED-CLEAN

This is a status wherein it is possible that the data block is also stored in the other cache memory, and the consistency with the main memory is achieved.

<4> EXCLUSIVE-DIRTY

This is a status wherein the data block is not stored in the other cache memory, contents thereof have been rewritten, the consistency with the main memory is broken, and the associated process has not reached the synchronous point.

<5> SHARED-DIRTY

This is a status wherein it is possible that the data block is also stored in the other cache memory, contents thereof have been rewritten, the consistency with the main memory is broken, and the associated process has not reached the synchronous point.

<6> RELEASED

This is a status wherein the data block is not stored in the other cache memory, contents thereof have been rewritten, the consistency with the main memory is broken, and the associated process has reached the synchronous point.

Hereinbelow, an operation of the system will be described.

The following explanation relates to a case wherein access is issued from the processor 10. However, the present invention is not limited thereto. The same process can be applied to a case wherein access is issued from the processor 15.

Figure 12:
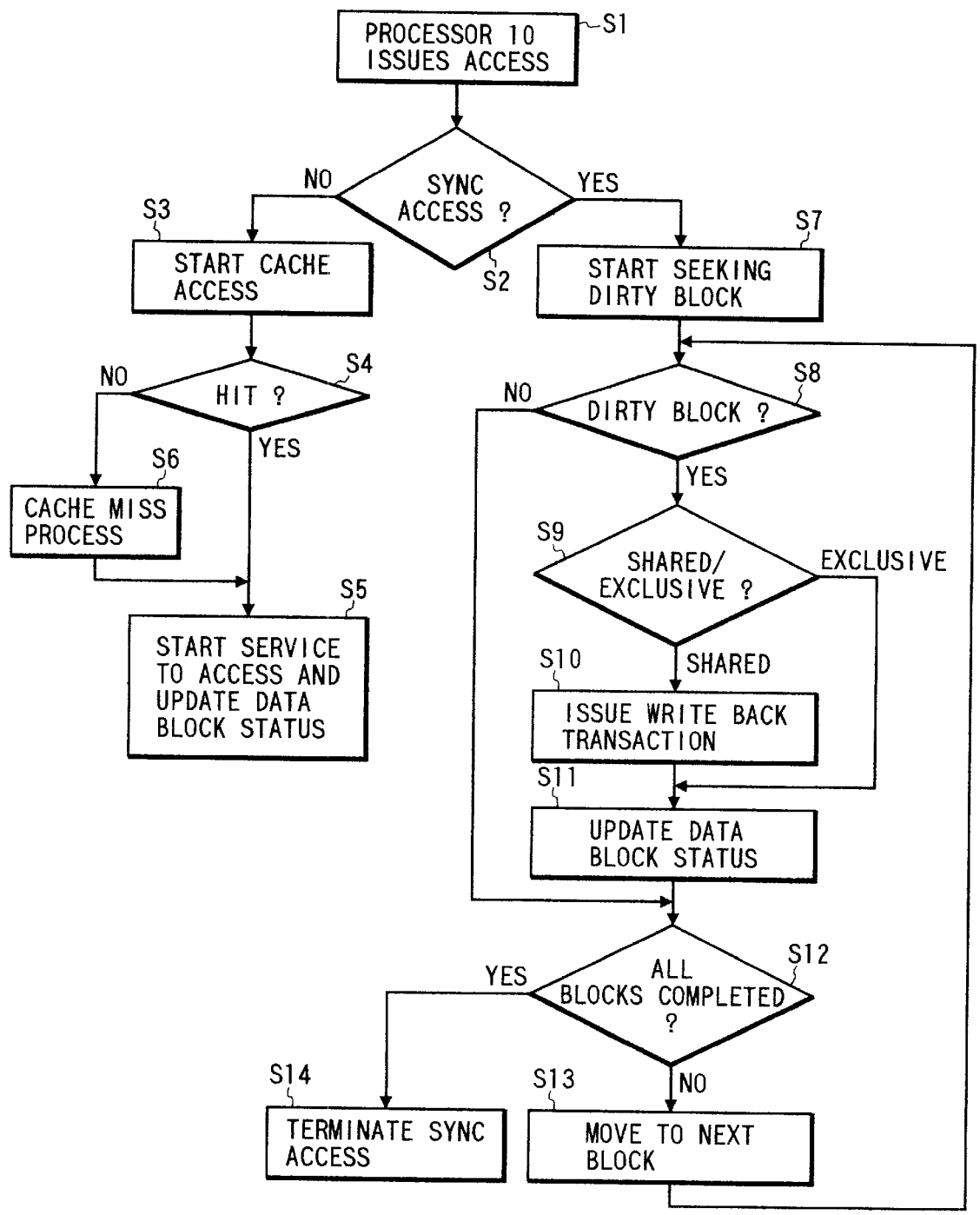
FIG. 12 is a flowchart showing an operation of the cache memory triggered by an access issuance from a processor according to the third preferred embodiment.

FIG. 12 is a flowchart of an operation triggered by an access from the processor 10.

When the processor 10 issues an access at step S1, the processor bus control signal interface 105 decodes an outputted control signal and notifies the controller 100 of an issuance of access from the processor 10. Specifically, at step S2, the processor bus control signal interface 105 determines whether it is a synchronous access or not, and notifies the controller 100 of the issuance of access from the processor and an access attribute (read/write, access size, whether synchronous access or not, and the like). In this preferred embodiment, the processor 10 can issue the access defined as a synchronous access and, by decoding the control signal indicative of an access kind, it can be determined whether the issued access is the synchronous access or not. In case of using a processor which can not issue the access defined as a synchronous access, a register is provided at a side of the cache memory and the processor issues an access relative to an address assigned to the register so as to notify the cache memory of an issuance of the synchronous access.

If the issued access is not the synchronous access, the cache memory performs its general operation as shown at steps S3 through S6.

At step S3, the cache access is started by the process described hereinbelow.

Using the control signal line 117, the controller 100 instructs the processor bus address signal interface 106 to output an address into the cache memory 11. In response to this, the processor bus address signal interface 106 outputs the address, that is, the tag field onto the address signal line 113, the set field onto the address line 114 and the in-block field onto the address line 115. The controller 100 asserts the OE signal 122 of the tag memory 101. If the access issued by the processor 10 is a read access, the controller 100 also asserts the OE signal 119 of the data memory 102 simultaneously. The tag memory 101 outputs contents of an entry designated by the set field.

Then, step S4 determines whether a cache hit is achieved, based on the following process.

The outputted data is compared with the tag field at the comparator 103, and a result of the comparison (agreement/disagreement) is notified to the controller 100 via the signal line 124. If the notified comparison result is agreement, it means the cache hit so that the service to the access is started at step S5. On the other hand, in case of disagreement, it means the cache miss so that a cache miss process is performed at step S6.

Specifically, if the comparison result notified from the comparator 103 is disagreement, it means the cache miss so that the cache miss process is performed in the following manner.

If a status of the concerned entry is INVALID (status value 0b0xxx), EXCLUSIVE-CLEAN (0b1000) or SHARED-CLEAN (0b1100), the controller 100, using the signal line 112, instructs the system bus control signal interface 108 to acquire the system bus.

Using the system bus control signal line 21, the system bus control signal interface 108 demands use of the system bus to the bus arbiter 24. After mediation, the bus arbiter 24, using the control signal line 21, permits use of the system bus to the system bus control signal interface 108. Using the signal line 112, the system bus control signal interface 108 notifies the controller 100 of acquirement of the system bus. Using the signal line 127, the controller 100 instructs the system bus address signal interface 109 to output an address signal onto the system bus. Further, using the signal line 112, the controller 100 instructs the system bus control signal interface 108 to start a read transaction. The system bus address signal interface 109 outputs the address onto the system bus address signal line 22, and the system bus control signal interface 108 starts the read transaction according to a bus protocol.

At this time, the other cache memory 11, 16 performs a later-described snoop operation and presents onto the control signal line 21 according to the bus protocol whether the data block as being an object of the transaction exists in the own cache memory or not and whether a write back operation triggered by a snoop hit relative to the data block of a later-described RELEASED status is performed or not. The main memory 20 performs the service to the read transaction after completion of the write back process when it occurs, while immediately when it does not occur.

Upon completion of preparation of the data, the main memory 20, using the control signal line 21, starts a termination operation according to the bus protocol. The system bus control signal interface 108, using the signal line 112, notifies the controller 100 of the start of the termination operation, and the controller 100, using the signal line 126, instructs the system bus data signal interface 110 to take in the data. The system bus data signal interface 110 takes in the data and outputs the taken-in data onto the data signal line 116 in the cache memory 11, 16. Simultaneously, the controller 100 asserts the WE signal 120 of the data memory 102 so as to write the data into the data memory 102.

Further, using the signal line 123, the controller 100 performs a direction control of the buffer 104 so as to output a tag field of the address into the tag memory 101, and outputs a status signal encoded with EXCLUSIVE-CLEAN when the concerned data block does not exist in the other cache memory 11, 16 and with SHARED-CLEAN when the concerned data block exists in the other cache memory 11, 16, into the tag memory 101 for writing into the tag memory 101 using the WE signal 122.

If a status of the concerned entry is EXCLUSIVE-DIRTY (status value 0b1010), SHARED-DIRTY (0b1110) or RELEASED (0b1011), similar to the foregoing and according to the bus protocol, a write transaction is issued onto the system bus so as to write back the data block in the concerned entry into the main memory. Thereafter, a read transaction is issued onto the system bus so as to read out the concerned data block from the main memory for storing into the concerned entry.

If a status of the cache hit data block is RELEASED (status value 0b1011) and the access is the write access, the write back of the concerned data block relative to the main memory 20 is performed before performing the service to the access.

Now, the service to the access and the status updating of the data block at step S5 will be explained.

LOAD Instruction

The following represents a control procedure by the cache 11 upon execution of a LOAD instruction for reading the data block into the processor 10 from the main memory 20.
(a) Using the control signal line 118, the controller 100 instructs the processor bus data signal interface 107 to output data designated by the in-block field of the address onto the data signal line 14 of the processor bus.
(b) Using the control signal line 111, the controller 100 instructs the processor bus control signal interface 105 to terminate the access.
(c) The processor bus data signal interface 107 outputs the data onto the data signal line 14, and the processor bus control signal interface 105 terminates the access.
(d) The processor 10 receives the data.

STORE Instruction

The following represents a control procedure by the cache 11 upon execution of a STORE instruction.

(a) Using the control signal line 118, the controller 100 instructs the processor bus data signal interface 107 to output data on the data signal line 14, 19 onto the data signal line 116 in the cache memory 11, 16. The processor bus data signal interface 107 outputs the data onto the data signal line 116.

(b) The controller 100 asserts the WE signal 120 of the data memory 102 corresponding to designation by the in-block field of the address so as to update the concerned data block.

(c) The controller 100 outputs onto the signal line 124 a signal encoded with EXCLUSIVE-DIRTY if the former status was EXCLUSIVE-CLEAN or RELEASED and with SHARED-DIRTY if the former status was SHARED-CLEAN, and asserts the WE signal 122 of the tag memory 101 so as to update the status of the concerned data block.

Now, an operation will be explained when the issued access is the synchronous access at step S2.

At step S7, seeking of a DIRTY block is started.

(1) The controller 100 outputs a value 0×000 onto the address line 114 corresponding to the set field and simultaneously asserts the OE signal 121 of the tag memory 101. Further, using the control signal 123, the controller 100 performs a direction control of the buffer 104 such that the tag data outputted from the tag memory 101 is outputted onto the address line 113 corresponding to the tag field. Simultaneously, the controller 100 asserts the OE signal 119 of the data memory 102.

Step S8 determines whether it is a DIRTY block. If not the DIRTY block, the routine proceeds to a process at step S12. On the other hand, if determined to be the DIRTY block at step S8, the routine proceeds to a process at step S9.

(2) At step S9, the controller 100 judges a status value of the data block outputted from the tag memory 101 and, if the status value (V flag, S flag, D flag and R flag) of the data block outputted from the tag memory 101 is 0b1010 (EXCLUSIVE-DIRTY) or 0b1110 (SHARED-DIRTY), the routine proceeds to step S10 where the below-noted operation is performed.

On the other hand, if the status value of the data block outputted from the tag memory 101 is determined to be 0b0xxx (INVALID), 0b1000 (EXCLUSIVE-CLEAN), 0b1100 (SHARED-CLEAN) or 0b1011 (RELEASED) at step S9, the controller 100 performs no particular operation and starts checking the next data block.

In Case Of EXCLUSIVE-DIRTY (0b1010)

The controller 100 negates the OE signal 121 of the tag memory 101, outputs a new status value 0b1011 indicative of the RELEASED status onto the signal line 124 and asserts the WE signal 122 of the tag memory 101 for writing it into the concerned entry of the tag memory 101.

In Case Of SHARED-DIRTY (0b1110)

The write back process and the updating of the status of the data block are performed in the following manner.

Using the signal line 112, the controller 100 instructs the system bus control signal interface 108 to acquire the system bus. Using the control signal line 21 of the system bus, the system bus control signal interface 108 demands use of the system bus to the bus arbiter 24. After mediation, the bus arbiter 24, using the control signal line 21, permits use of the system bus to the system bus control signal interface 108. Using the signal line 112, the system bus control signal interface 108 notifies the controller 100 of acquirement of the system bus. Using the signal line 127, the controller 100 instructs the system bus address signal interface 109 to output an address signal onto the system bus and, using the signal line 126, instructs the system bus data signal interface 110 to output a data signal onto the system bus.

Further, at step S10, the controller 100, using the signal line 112, instructs the system bus control signal interface 108 to start the write transaction. The system bus address signal interface 109 outputs the address onto the address signal line 22 of the system bus, the system bus data signal interface 110 outputs the data onto the data signal line 23 of the system bus, and the system bus control signal interface 108 starts the write transaction according to the bus protocol.

At this time, the other cache memory 11, 16 performs a later-described snoop operation. The main memory 20 performs the service to the write transaction and starts the termination operation.

Using the signal line 112, the system bus control signal interface 108 notifies the controller 100 of the start of the termination operation. Using the control signal lines 127 and 126, the controller 100 instructs the system bus address signal interface 109 and the system bus data signal interface 110 to stop outputting the address and the data onto the system bus.

The controller 100 negates the OE signal 121 of the tag memory 101, outputs a new status value 0b1000 indicative of the EXCLUSIVE-CLEAN status onto the signal line 124 and asserts the WE signal 122 of the tag memory 101 for writing it into the concerned entry of the tag memory 101.

Step S12 determines whether the seeking of all the data blocks is completed or not. If determined not to be completed, the foregoing operation is repeated until the set field reaches 0×fff, being incremented by a unit of 0×001, so as to complete the seeking operation.

If determined at step S12 that the seeking of all the data blocks has been completed, the controller 100, using the signal line 111, instructs the processor bus control signal interface 105 to terminate the synchronous access issued by the processor 10, 15, and the processor bus control signal interface 105 terminates the access (step S14).

Relative to the read transaction or the write transaction issued onto the system bus from the cache memory 11, 16 in the foregoing fashion, the other cache memory 16, 11 performs the following snooping operation.

Figure 13:
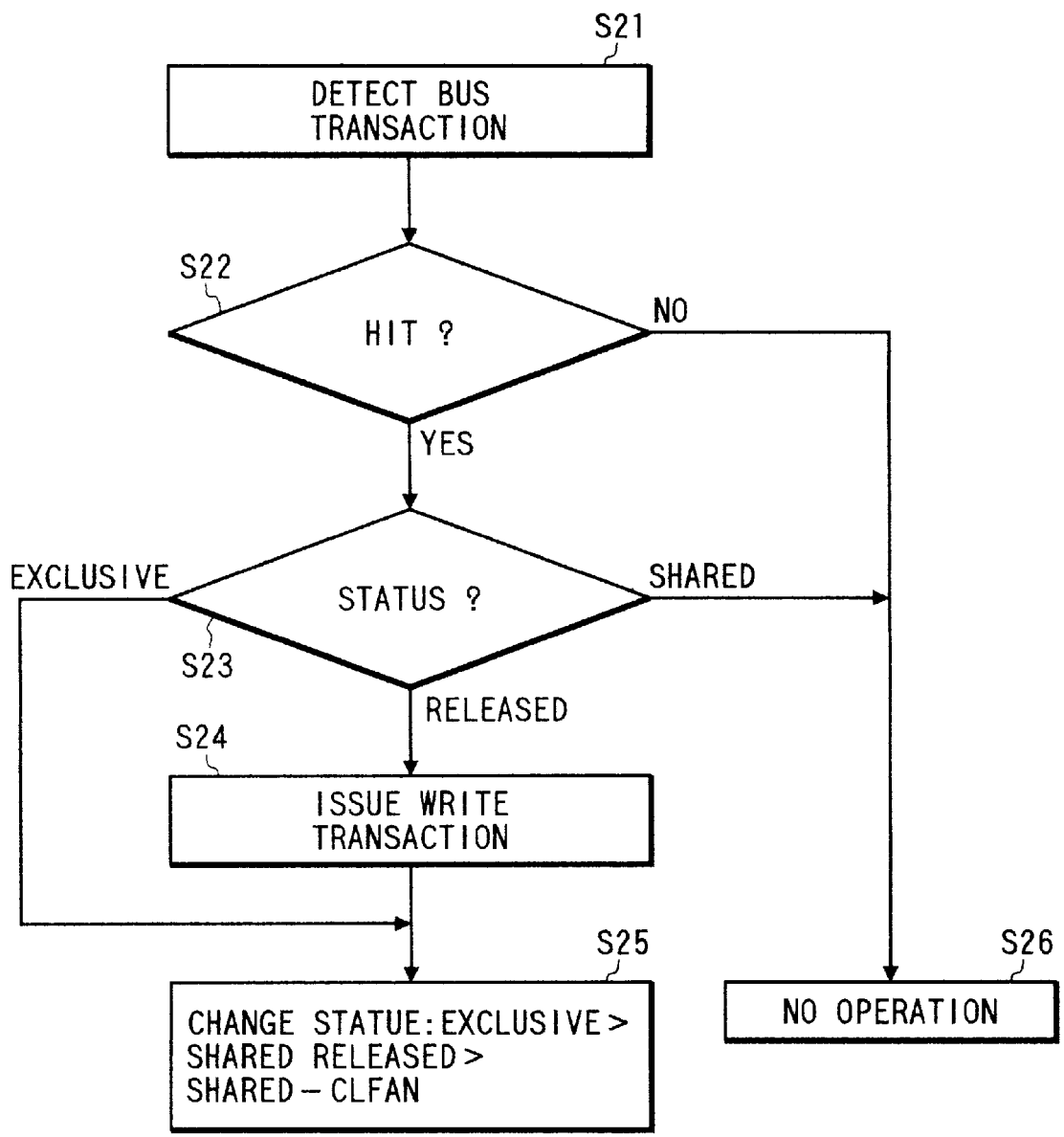
FIG. 13 is a flowchart of an operation of the cache memory triggered by a bus transaction.

FIG. 13 shows an operation flowchart.

If, at step S21, the system bus control signal interface 108 detects an issuance of the transaction onto the system bus, it notifies the controller 100 using the signal line 112.

Using the signal line 127, the controller 100 instructs the system bus address signal interface 109 to output an address outputted on the system bus into the cache memory. The system bus address signal interface 109 outputs a set field corresponding part onto the address line 114 and a tag field corresponding part onto the address line 113.

The controller 100 asserts the OE signal 121 of the tag memory 101. The tag memory 101 outputs contents of an entry designated by the set field. At step S22, tag data among the outputted contents is compared with the tag field of the address at the comparator 103 and a result of the comparison (agreement/disagreement) is notified to the controller 100 via the signal line 125. Further, the status value of the concerned entry is notified to the controller 100 via the signal line 124.

If not hit at step S22, that is, the comparison result from the comparator 103 is disagreement, that is, the transaction object issued onto the system bus is not stored in the own cache memory, the routine proceeds to step S26 where no operation is performed and this series of operation is finished.

On the other hand, if hit at step S22, that is, the comparison result from the comparator 103 is agreement, the following operation is performed depending on whether the transaction is read or write and depending on a status of the concerned data block.

Hereinbelow, explanation will be made using steps S23 through S26 in case of the read transaction.

If the concerned data block is SHARED-CLEAN (status value 0b1100) or SHARED-DIRTY (0b1110), the routine proceeds to step S26 where no operation is performed and this series of operation is finished. If it is EXCLUSIVE-CLEAN (0b1000), the status is changed to SHARED-CLEAN (0b1100) and, if it is EXCLUSIVE-DIRTY (0b1010), the status is changed to SHARED-DIRTY (0b1110), in the same manner as in the foregoing. If it is RELEASED (0b1011), the routine proceeds to step S24 where the transaction issued onto the system bus is once stopped and the write transaction of the concerned data block is issued according to the bus protocol in the same manner as in the foregoing.

After completion of the write transaction, the status of the concerned data block is changed to SHARED-CLEAN (0b1100) at step S25. The data block is written back into the main memory 20, and the main memory 20 performs the service to the reissued read transaction.

Hereinbelow, explanation will be made in case of the write transaction.

In theory, the write transaction occurs only when the data block is SHARED-CLEAN (status value 0b1100) or SHARED-DIRTY (0b1110).

In case of SHARED-CLEAN, the invalidation process is performed by changing the status to INVALID (0b0xxx). Although the invalidation process is also performed in case of SHARED-DIRTY, such a situation is against the rule in the present system.

Other Embodiments

Figure 14:
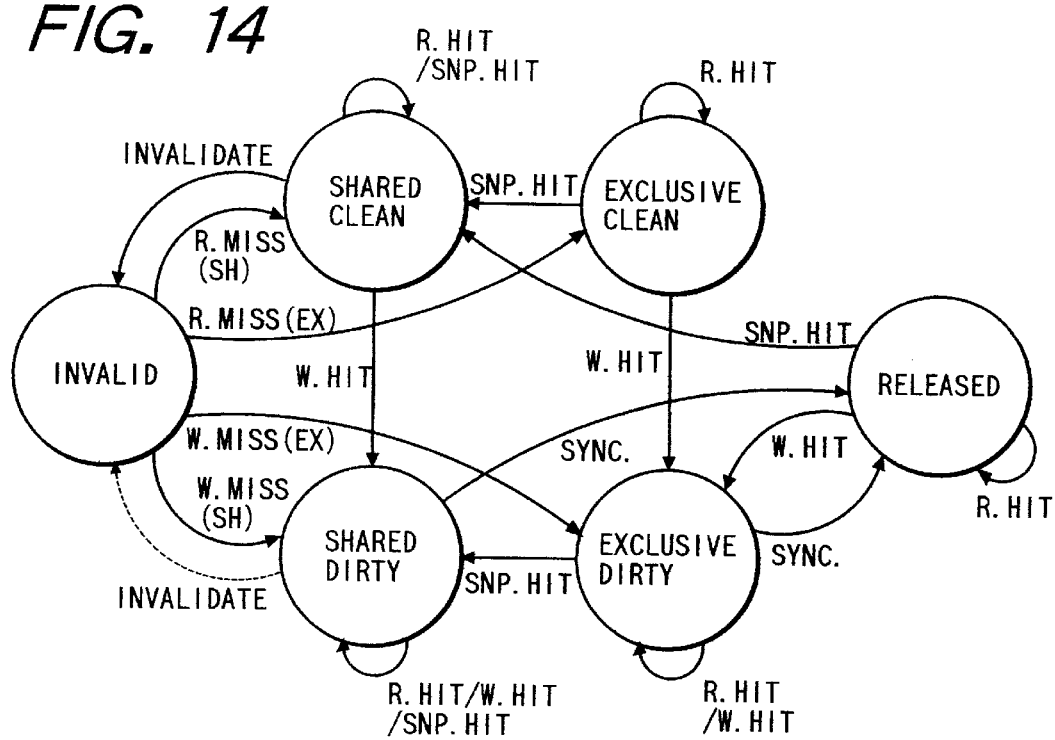
FIG. 14 is a status transition diagram of a data block in a cache memory according to a fourth preferred embodiment of the present invention.

FIG. 14 is a status transition diagram of a data block in a cache memory according to a fourth preferred embodiment of the present invention.

Since the structure of the system is the same as the foregoing, explanation thereof will be omitted.

An operation of the system follows FIG. 14 and differs from the third preferred embodiment in that an invalidation transaction without data is issued onto the system bus relative to a data block of the SHARED-DIRTY status upon issuance of a synchronous access from the processor so as to change the status to the RELEASED status. Accordingly, it differs from the third preferred embodiment in that, upon issuance of the synchronous access from a certain processor, the invalidation transaction is issued from a cache memory associated with that processor and the main memory is not updated at that time point.

Figure 15:
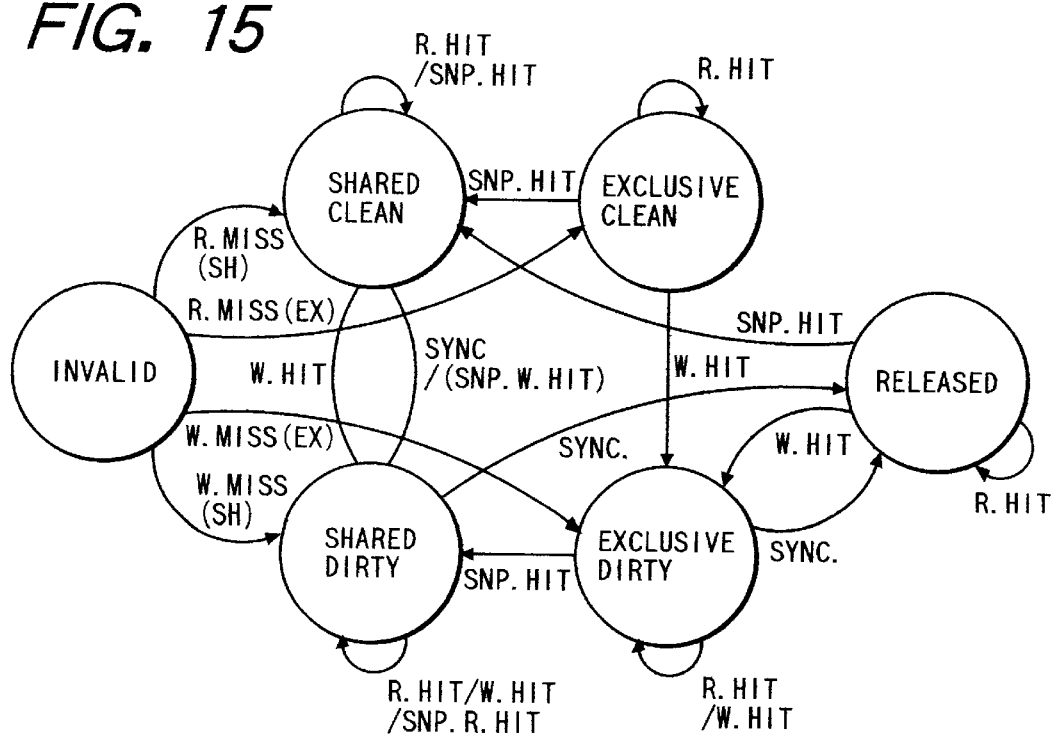
FIG. 15 is a status transition diagram of a data block in a cache memory according to a fifth preferred embodiment of the present invention.

FIG. 15 is a status transition diagram of a data block in a cache memory according to a fifth preferred embodiment of the present invention.

Since the structure of the system is the same as the foregoing, explanation thereof will be omitted.

The fifth preferred embodiment is featured in operation in that, upon issuance of a synchronous access from the processor, when updating the main memory relative to a data block of the SHARED-DIRTY status, the concerned data block in the other cache memory is also updated simultaneously.

As described above, the RELEASED state, that is, the state wherein the process of the processor relative to the corresponding data block reaches the predetermined synchronous point, is defined as one of the states of the data block, and the consistency holding operation is controlled not to be performed at that time point relative to the transaction, on the mutual coupling network, associated with the cache miss process for the data block of a status other than the RELEASED status. With this arrangement, the unnecessary consistency holding operation is omitted in the information processing device employing the loose memory consistency model so that a delay upon cache miss processing can be reduced to improve the system performance.

Further, when the process of the processor reaches the predetermined synchronous point, all the data blocks existing in the cache memory are checked. With respect to the data block whose status is the EXCLUSIVE-DIRTY status, that is, the status where the concerned data block is not stored in the other cache memory and the consistency with the main memory is broken, the status is changed to the RELEASED status. Upon issuance of the transaction for the concerned data block onto the mutual coupling network, the service operation is performed relative to the concerned data block. In the third preferred embodiment, relative to the data block whose status is the SHARED-DIRTY status, that is, the status where it is possible that the concerned data block is also stored in the other cache memory and the consistency with the main memory is broken, the main memory is updated and the concerned data block existing in the other cache memory is invalidated.

In the fourth preferred embodiment, the main memory is not updated at the synchronous point and the concerned data block existing in the other cache memory is invalidated. Upon issuance of the transaction for the concerned data block onto the mutual coupling network, the service operation is performed relative to the concerned data block.

In the fifth preferred embodiment, the main memory is updated and the concerned data block existing in the other cache memory is also updated.

By performing the foregoing operations, with respect to the data block of the EXCLUSIVE-DIRTY state as being a non-common data block at that time point, the state thereof is changed, which is achieved by a relatively low cost method, so as to open the own-rewritten data to the system to reduce the overhead at the synchronous point. This improves the system performance. Further, with respect to the data block of the SHARED-DIRTY state as being a common data block at that time point, in view of a subsequent use frequency or the like of the concerned data block in the other cache memory, the method of the third preferred embodiment where the cost is minimum but the hit ratio in the other cache memory is also expected to be the lowest, the method of the fifth preferred embodiment where the cost is high and the hit ratio in the other cache memory is also expected to be high, the method of the first preferred embodiment where the cost is similar to that of the fifth preferred embodiment and the unnecessary data block is resultingly removed in the cache memory, or their derived methods may be selectively used to reduce the overhead at the synchronous point and thereafter. This improves the system performance.

As described above, according to the present invention, in the information processing device which performs the operation based on the loose memory consistency model, the unnecessary consistency holding operation is omitted to reduce a delay upon cache miss processing so that the system performance can be improved.

Further, with respect to the data block of the EXCLUSIVE-DIRTY state as being a non-common data block, the state thereof is changed, which is achieved by a relatively low cost method, so as to open the own-rewritten data to the system to reduce the overhead at the synchronous point so that the system performance can be improved.

What is claimed is:

1. An information processing device comprising:
   a plurality of processors;
   a plurality of cache memories associated with said processors, respectively, wherein a function is provided in each of the cache memories for detecting based on a demand kind issued by a corresponding processor that the process of the processor reaches a predetermined stage, as means for the processor to notify the associated cache memory that the predetermined stage has been reached; and
   a storage device, and a coupling network mutually connecting between said cache memories and said storage device,
   wherein consistency holding of data blocks existing in the cache memories is performed when a number of processing requests from said plurality of processors reaches a predetermined value greater than one.

2. The information processing device according to claim 1, wherein a function is provided in each of the cache memories for detecting based on an address issued by the corresponding processor and that the process of the processor reaches the predetermined stage, as means for the processor to notify the associated cache memory that the predetermined stage has been reached.

3. The information processing device according to claim 1, wherein said information processing device performs an operation based on a loose memory consistency model.

4. The information processing device according to claim 2, wherein said information processing device performs an operation based on a loose memory consistency model.

5. The information processing device according to claim 1, wherein said determining means determines based on a status of the data block.

6. The information processing device according to claim 1, wherein said determining means determines whether the process of the processor reaches the predetermined stage and wherein means for performing the consistency holding of the data blocks existing in the cache memories performs the consistency holding based on a status management with respect to the data blocks occupied at a stage where the consistency holding is performed.

7. The information processing device according to claim 5, wherein a function is provided in each of the cache memories for detecting based on a demand kind issued by the corresponding processor that the process of the processor reaches the predetermined stage, as means for the processor to notify it to the associated cache memory.

8. The information processing device according to claim 6, wherein a function is provided in each of the cache memories for detecting based on a demand kind issued by the corresponding processor that the process of the processor reaches the predetermined stage, as means for the processor to notify it to the associated cache memory.

9. The information processing device according to claim 5, wherein a function is provided in each of the cache memories for detecting based on an address issued by the corresponding processor that the process of the processor reaches the predetermined stage, as means for the processor to notify it to the associated cache memory.

10. The information processing device according to claim 6, wherein a function is provided in each of the cache memories for detecting based on an address issued by the corresponding processor that the process of the processor reaches the predetermined stage, as means for the processor to notify it to the associated cache memory.

11. The information processing device according to claim 5, wherein said information processing device performs an operation based on a loose memory consistency model.

12. The information processing device according to claim 6, wherein said information processing device performs an operation based on a loose memory consistency model.

13. The information processing device according to claim 7, wherein said information processing device performs an operation based on a loose memory consistency model.

14. The information processing device according to claim 8, wherein said information processing device performs an operation based on a loose memory consistency model.

15. The information processing device according to claim 9, wherein said information processing device performs an operation based on a loose memory consistency model.

16. The information processing device according to claim 10, wherein said information processing device performs an operation based on a loose memory consistency model.

17. An information processing device including a plurality of processors, a plurality of cache memories associated with said processors, respectively, a storage device, and a coupling network mutually connecting between said cache memories and said storage device, said information processing device comprising:
   determining means for determining whether an access from the processor to the associated cache memory is a synchronous access or not by counting processing requests made by said plurality of processors and comparing the count to a predetermined value greater than one;
   searching means for searching a particular block in said cache memory when the synchronous access is determined by said determining means; and
   write back means for performing write back to said storage device with respect to the particular block searched by said searching means.

18. An information processing device including a plurality of processors, a plurality of cache memories associated with said processors, respectively, a storage device, and a coupling network mutually connecting between said cache memories and said storage device, wherein consistency holding of data blocks existing in the cache memories is performed when a number of processing requests from said plurality of processors reaches a predetermined value greater than one, said information processing device comprising:
   determining means for determining, upon performing the consistency holding of the data blocks existing in said cache memories, the data blocks to be subjected to the consistency holding;
   status changing means for performing a status change relative to the data blocks determined by said determining means; and
   data transfer means for performing a data transfer at a certain timing.

19. The information processing device according to claim 18, wherein a function is provided in each of the cache memories for detecting based on a demand kind issued by the corresponding processor that the process of the processor reaches the predetermined stage, as means for the processor to notify it to the associated cache memory.

20. The information processing device according to claim 18, wherein a function is provided in each of the cache memories for detecting based on an address issued by the corresponding processor that the process of the processor reaches the predetermined stage, as means for the processor to notify it to the associated cache memory.

21. The information processing device according to claim 18, wherein said information processing device performs an operation based on a loose memory consistency model.

22. The information processing device according to claim 19, wherein said information processing device performs an operation based on a loose memory consistency model.

23. The information processing device according to claim 20, wherein said information processing device performs an operation based on a loose memory consistency model.

24. A control method of an information processing device including a plurality of processors, a plurality of cache memories associated with said processors, respectively, a storage device, and a coupling network mutually connecting between said cache memories and said storage device, wherein consistency holding of data blocks existing in the cache memories is performed when a number of processing requests from said plurality of processors reaches a predetermined value greater than one, said control method comprising the steps of:

determining, upon performing the consistency holding of the data blocks existing in said cache memories, the data blocks to be subjected to the consistency holding;

performing a status change relative to the data blocks determined at said determining step; and performing a data transfer at a certain timing.

25. A control method of an information processing device including a plurality of processors, a plurality of cache memories associated with said processors, respectively, wherein a function is provided in each of the cache memories for detecting based on a demand kind issued by a corresponding processor that the process of the processor reaches a predetermined stage, as means for the processor to notify the associated memory that the predetermined stage has been reached, a storage device, and a coupling network mutually connecting between said cache memories is performed when a number of processing requests from said plurality of processors reaches a predetermined value greater than one.

* * * * *